United States Patent
Chang et al.

(10) Patent No.: US 9,631,476 B2
(45) Date of Patent: Apr. 25, 2017

(54) VARIABLE STIFFNESS DOWNHOLE TOOL HOUSING

(75) Inventors: Chung Chang, Houston, TX (US); Arthur Cheng, Houston, TX (US); Gary Kainer, Tomball, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 221 days.

(21) Appl. No.: 14/401,099

(22) PCT Filed: May 17, 2012

(86) PCT No.: PCT/US2012/038268
§ 371 (c)(1),
(2), (4) Date: Nov. 13, 2014

(87) PCT Pub. No.: WO2013/172837
PCT Pub. Date: Nov. 21, 2013

(65) Prior Publication Data
US 2015/0101800 A1   Apr. 16, 2015

(51) Int. Cl.
*E21B 47/01* (2012.01)
*E21B 47/10* (2012.01)
(Continued)

(52) U.S. Cl.
CPC .............. *E21B 47/01* (2013.01); *E21B 17/00* (2013.01); *E21B 47/101* (2013.01); *E21B 49/08* (2013.01); *G01V 1/523* (2013.01)

(58) Field of Classification Search
CPC ................................ E21B 47/01; G01V 1/523
See application file for complete search history.

(56) References Cited

U.S. PATENT DOCUMENTS

| 4,872,526 A | 10/1989 | Wignall et al. |
| 5,036,945 A | 8/1991 | Hoyle et al. |

(Continued)

FOREIGN PATENT DOCUMENTS

WO   WO-2013/172837   11/2013

OTHER PUBLICATIONS

PCT International Search Report and Written Opinion, dated Aug. 16, 2012, U.S. Appl. No. 12/600,501, "Variable Stiffness Downhole Tool Housing", filed Nov. 17, 2009, 12 pgs.

(Continued)

*Primary Examiner* — George Gray
(74) *Attorney, Agent, or Firm* — Iselin Law PLLC; Benjamin Fite (57) ABSTRACT

Various systems and methods for implementing and using a variable stiffness downhole tool housing include cylindrical segments positioned along a common axis, with a pair of segments each coupled to a bulkhead and positioned at either axial end of the tool housing. The housing also includes a flexible cylindrical sleeve, positioned along the common axis between two of the plurality of cylindrical segments, that includes a first and second region with an outer diameter no larger than a common segment inner diameter and a third region located between the first and second regions and with an outer diameter no larger than a common segment outer diameter (the first and second regions each at least partially inserted into an end of one segment). A stiffness controller controls the stiffness of the tool housing by controlling at least part of an axial force exerted between the two segments.

18 Claims, 8 Drawing Sheets

(51) Int. Cl.
*E21B 17/00* (2006.01)
*G01V 1/52* (2006.01)
*E21B 49/08* (2006.01)

(56) References Cited

U.S. PATENT DOCUMENTS

| | | | |
|---|---|---|---|
| 5,229,553 | A | 7/1993 | Lester et al. |
| 5,289,433 | A | 2/1994 | Cowles et al. |
| 5,343,001 | A * | 8/1994 | Cowles .................... G01V 1/52 |
| | | | 181/102 |
| 5,728,978 | A * | 3/1998 | Roberts .................. G10K 11/16 |
| | | | 181/102 |
| 6,474,439 | B1 | 11/2002 | Hoyle et al. |
| 6,671,380 | B2 | 12/2003 | Chang et al. |
| 6,782,970 | B2 | 8/2004 | Chang et al. |
| 7,334,661 | B2 | 2/2008 | Pabon et al. |
| 7,336,562 | B1 | 2/2008 | Hoyle et al. |
| 7,578,359 | B2 | 8/2009 | Coates et al. |
| 8,698,502 | B2 | 4/2014 | Li et al. |
| 2003/0121655 | A1* | 7/2003 | Lauritzen .................. E21B 4/18 |
| | | | 166/207 |
| 2005/0279565 | A1 | 12/2005 | Arian et al. |
| 2007/0119589 | A1 | 5/2007 | Hall et al. |
| 2008/0142266 | A1* | 6/2008 | Nichols ..................... E21B 7/28 |
| | | | 175/57 |
| 2011/0308858 | A1* | 12/2011 | Menger ................... E21B 7/067 |
| | | | 175/24 |

OTHER PUBLICATIONS

PCT International Preliminary Report on Patentablility, dated Sep. 30, 2014, Appl No. PCT/2012/038268, "Variable Stiffness Downhole Tool Housing," Filed May 17, 2012, 21 pgs.

* cited by examiner

VARIABLE STIFFNESS DOWNHOLE TOOL HOUSING

BACKGROUND

Oil field operators demand access to a great quantity of information regarding the parameters and conditions encountered downhole. A wide variety of logging tools have been and are being developed to collect information relating to such parameters as position and orientation of the bottom hole assembly, environmental conditions in the borehole, and characteristics of the borehole itself as well as the formations being penetrated by the borehole. Among such tools are acoustic logging tools, which generate acoustic signals at one end of the tool that are transmitted through the formation to receivers at the other end of the tool. By measuring the arrival times of the different types of waves at the receivers it is possible to assess the makeup of the formation between the transmitters and the receivers.

Among the waves that are propagated are pressure waves (P-waves), shear waves (S-waves), Rayleigh waves, mud waves and Stoneley waves. The Rayleigh, mud and Stoneley waves generally propagate much more slowly than P-waves and S-waves and thus arrive at the receivers after the P-wave and S-wave (generally the waves of interest). Because of this, the other three slower wave types can easily be masked. P-waves and S-waves, however, can propagate along the body of the tool, thus requiring a tool designer to implement structures in the tool to attenuate and/or slow the propagation of such waves to avoid interference with the reception of these waves through the formation.

Designing an acoustic logging tool that is robust enough for a downhole environment while still providing acoustic isolation between the transmitters and receivers of the tool can be challenging. Many materials that provide good acoustic isolation, attenuation and/or wave propagation delay are soft and not as strong as other materials that may be preferred for use in a tool housing. Further, structures used to slow down and scatter acoustic waves frequently use gaps that produce a tool surface that is not smooth, can reduce tool strength, can become clogged with debris, and can interfere with and degrade the quality of received signals of interest. And neither the materials nor the structures currently in use address the need for acoustic tools that are long enough to provide adequate transmitter and receiver separation while still being navigable through boreholes that contain sharp bends, doglegs or other abrupt deviations.

BRIEF DESCRIPTION OF THE DRAWINGS

Accordingly, there are disclosed in the drawings and the following description specific examples of system and methods implementing and using variable stiffness downhole tool housings. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The paragraphs that follow describe illustrative variable stiffness downhole tools in more detail. First, we present an overview of drilling and logging environments within which the described embodiments may be incorporated and used. This overview is followed by more detailed descriptions of an illustrative acoustic logging tool isolator embodiment. Finally, we present an illustrative method for using a downhole tool incorporating such an embodiment.

Figures 1, 2:
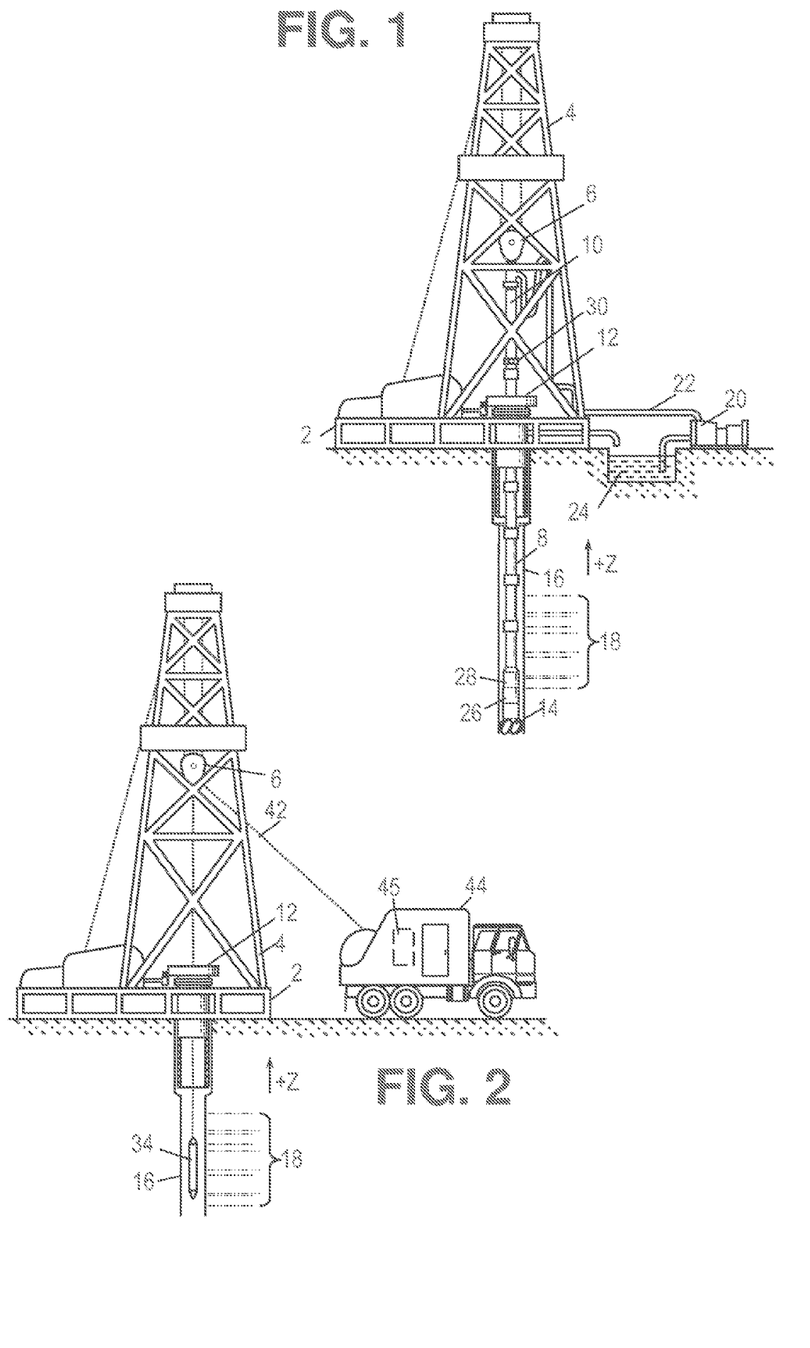
FIG. 1 shows an illustrative drilling rig.
FIG. 2 shows an illustrative wireline logging environment.

FIG. 1 shows an illustrative logging while drilling (LWD) environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An LWD tool 26 is integrated into the bottom-hole assembly near the bit 14. As the bit extends the borehole through the formations, logging tool 26 collects measurements relating to various formation properties as well as the tool orientation and various other drilling conditions. The logging tool 26 may take the form of a drill collar, i.e., a thick-walled tubular that provides weight and rigidity to aid the drilling process. A telemetry sub 28 may be included to transfer measurement data to a surface receiver 30 and to receive commands from the surface. In some embodiments, the telemetry sub 28 does not communicate with the surface, but rather stores logging data for later retrieval at the surface when the logging assembly is recovered.

At various times during the drilling process, the drill string 8 may be removed from borehole 16 as shown in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. A wireline logging tool 34 may have pads and/or centralizing springs (not shown) to maintain the tool near the axis of the borehole as the tool is pulled uphole. A surface logging facility 44 collects measurements from the logging tool 34, and includes a computer system 45 for processing and storing the measurements gathered by the logging tool.

Figure 3:
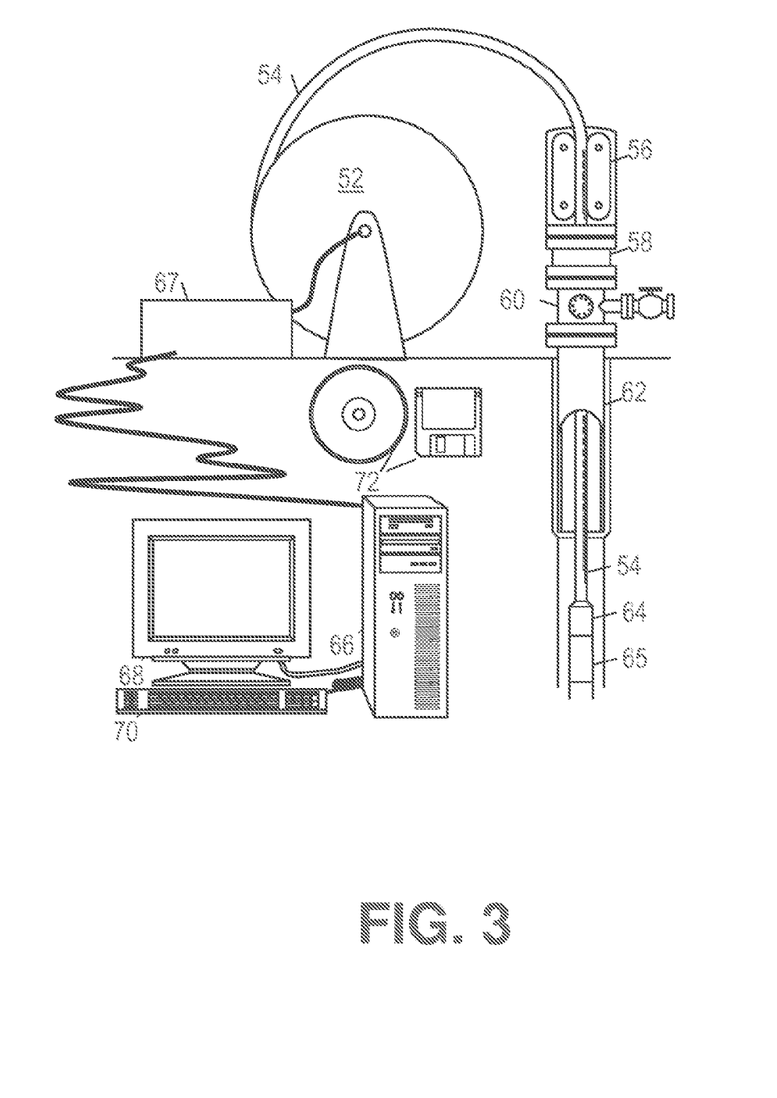
FIG. 3 shows an illustrative tubing-conveyed logging environment.

An alternative logging technique is logging with coil tubing. FIG. 3 shows an illustrative coil tubing-conveyed logging system in which coil tubing 54 is pulled from a spool 52 by a tubing injector 56 and injected into a well through a packer 58 and a blowout preventer 60 into the well 62. (It is also possible to perform drilling in this manner by driving the drill bit with a downhole motor.) In the well, a supervisory sub 64 and one or more logging tools 65 are coupled to the coil tubing 54 and optionally configured to communicate to a surface computer system 66 via information conduits or other telemetry channels. An uphole interface 67 may be provided to exchange communications with the supervisory sub and receive data to be conveyed to the surface computer system 66.

Surface computer system 66 is configured to communicate with supervisory sub 64 during the logging process or alternatively configured to download data from the supervisory sub after the tool assembly is retrieved. Surface computer system 66 is preferably configured by software (shown in FIG. 3 in the form of removable storage media 72) to process the logging tool measurements. System 66 includes a display device 68 and a user-input device 70 to enable a human operator to interact with the system software 72.

In each of the foregoing logging environments, the logging tool assemblies preferably include a navigational sensor package that includes directional sensors for determining the inclination angle, the horizontal angle, and the rotational angle (a.k.a. "tool face angle") of the bottom hole assembly. As is commonly defined in the art, the inclination angle is the deviation from vertically downward, the horizontal angle is the angle in a horizontal plane from true North, and the tool face angle is the orientation (rotational about the tool axis) angle from the high side of the borehole. In accordance with known techniques, directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the logging assembly can be determined. Additionally, a three axis magnetometer measures the earth's magnetic field vector in a similar manner. From the combined magnetometer and accelerometer data, the horizontal angle of the logging assembly can be determined. These orientation measurements, when combined with measurements from motion sensors, enable the tool position to be tracked downhole.

In these and other logging environments, measured parameters are usually recorded and displayed in the form of a log, i.e., a two-dimensional graph showing the measured parameter as a function of tool position or depth. In addition to making parameter measurements as a function of depth, some logging tools also provide parameter measurements as a function of rotational angle. Such tool measurements have often been displayed as two-dimensional images of the borehole wall, with one dimension representing tool position or depth, the other dimension representing azimuthal orientation, and the pixel intensity or color representing the parameter value.

Figure 4:
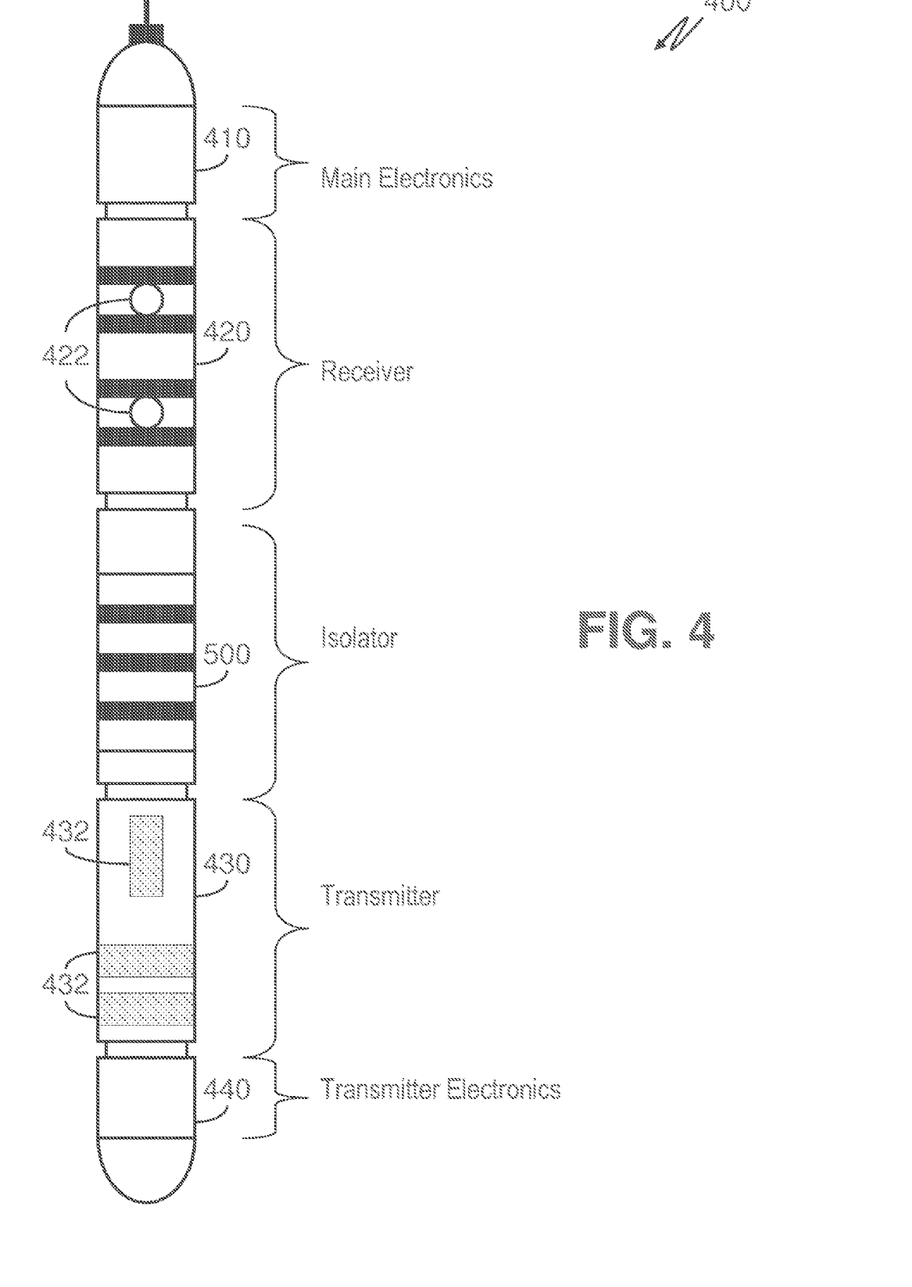
FIG. 4 shows an illustrative acoustic logging tool.

One type of logging tool that may be used to collect data from wells such as those previously described is an acoustic logging tool. FIG. 4 shows an example of an acoustic well logging tool 400 that incorporates an illustrative isolator embodiment 500. It should be noted that acoustic logging tool 400 is not drawn to scale in order to more clearly illustrate the individual components of the tool. The illustrative acoustic logging tool shown includes a main electronics module 410, a receiver module 420, an isolator 500, a transmitter module 430 and a transmitter electronics module 440. Transmitter electronics module 440 houses the electronics that couple to and control acoustic emitters 432 housed by transmitter module 430. Emitters 432 emit acoustic signals that are directed into the surrounding formation, through which the signals propagate, eventually being detected by acoustic sensors 422 within receiver module 420. Acoustic transducers suitable for use as acoustic emitters and sensors are well known in the art and are not discussed further.

Similarly, main electronics module 410 houses the electronics that couple to and receive signals from receiver module 420, as well as the electronics that process and/or store the received data and/or communicate with equipment on the surface. In some illustrative embodiments, transmitter electronics module 440 couples to and communicates with main electronics module 410 via electrical, optical or radio frequency (RF) links. In other illustrative embodiments, transmitter electronics module does not couple to electronics module 410 and operates autonomously based upon an internally stored program that is initiated prior to lowering acoustic logging tool 400 into the borehole.

Because the materials used to form many of the components of the various modules of downhole tools frequently include metals and metal alloys, which tend to be very good conductors of acoustic waves, acoustic signals generated by emitters 432 may propagate through the acoustic logging tool 400. Isolator 500 is positioned between and coupled to transmitter module 430 and receiver module 420, operating to attenuate and/or slow down acoustic waves that may propagate up the tool housing from emitters 432 to receivers 422. Such waves can interfere with the detection and measurement of the acoustic waves of interest propagating through the surrounding formation.

Figure 5:
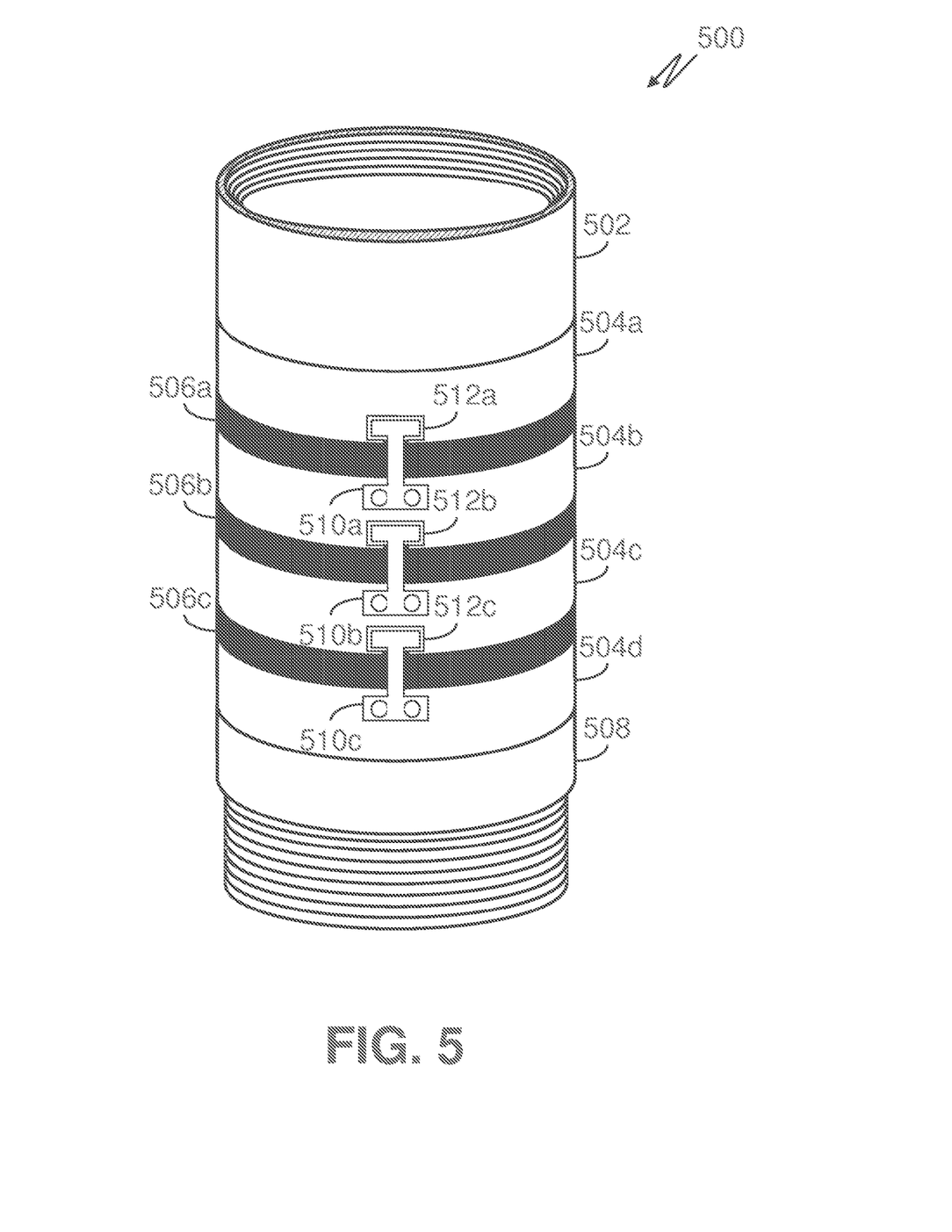
FIG. 5 shows an illustrative isolator segment of the acoustic logging tool of FIG. 4.

FIG. 5 shows a more detailed view of illustrative isolator 500, which is also not drawn to scale for clarity and only shows a small number of segments for simplicity. Illustrative isolator 500 includes two threaded end segments 502 and 508, each of which can accept the corresponding complementary thread from another tool section to allow the two sections to be secured to each other as part of a tool assembly. Any number of segments 504 may be positioned in between end segments 502 and 508, and four such segments (504a-504d) are shown in FIG. 5. In practice, an isolator would be expected to use between eight and twenty-four intermediate segments. Each segment 504 is spaced away from an adjacent segment by a spacer 506, and three such spacers (506a-506c) are shown in FIG. 5. The spacers 506 are made of a material or combination of materials that attenuate acoustic waves and have a high "slowness" value (i.e., a high acoustic wave travel time through the material) relative to the slowness of the segments 504. Contemplated materials include steel and/or other metals/alloys for the segments 504 and rubbers, fiber-reinforced rubbers, synthetic cloths and/or plastics for the spacers 506. The spacers 506 are each part of one or more sleeves (explained in more detail in the descriptions of FIGS. 6A and 6B below) that are inserted within the segments 504, and the segments 504 can move relative to the spacers while still maintaining contact with the sleeve(s). Such movement allows isolator 500 to expand and contract axially, and to flex laterally.

The illustrative isolator 500 of FIG. 5 also includes a series of keys 510 (510a-510c) and corresponding slots 512 (512a-512c) made of any of a variety of load bearing material (e.g., the same types of materials listed above for manufacturing the segments 504). Each key straddles two segments, but is only secured to one of the two segments straddled. In some embodiments, the key is secured by direct attachment to the outside of the segment (e.g., by a screw, bolt, rivet and/or weld), while in other embodiments the key is secured by a shouldered grove in one of the two segments (not shown) within which the key can move without becoming separated from the segment. In still other illustrative embodiments, the key may be machined directly into one of the two segments. The other end of a given key is positioned within an insert or slot in the other segment which is larger in all directions than the key to minimize contact between the key and the other segment when the key is properly positioned within the slot. Thus, for example, key 510a of FIG. 5 is attached to segment 504b, but is positioned as to maintain space between the edges of the key and slot 512a, as well as between the underside of the key facing segment 504a and the opposing face of slot 512a. The space may be left empty, or may be filled with a material similar to that used for spacers 506 if, for example, the tool using a housing like that of illustrative isolator 500 does not require acoustic isolation. This space acts as an acoustic barrier to prevent the transmission of acoustic waves between segments 504 through the keys, while still allowing the keys to mechanically limit the relative motion of the segments (generally during periods when the acoustic emitters of the tool are not active). Although only one key per segment pair is shown in the example of FIG. 5, at least some preferred embodiments incorporate three to four equally spaced keys per segment pair, while others may only have keys on some segment pairs (e.g., keys on every third segment pair), and still other may have keys that attach to one segment and run continuously through multiple segments with notches as described above. Many different numbers of keys per segment pair, segment pair intervals, key/notch configurations and circumferential spacings around the segments may be used, and all such key numbers, segment pair intervals, key/notch configurations and key spacings are within the scope of the present disclosure. Further, at least some embodiments may not use keys at all.

Figure 6A:
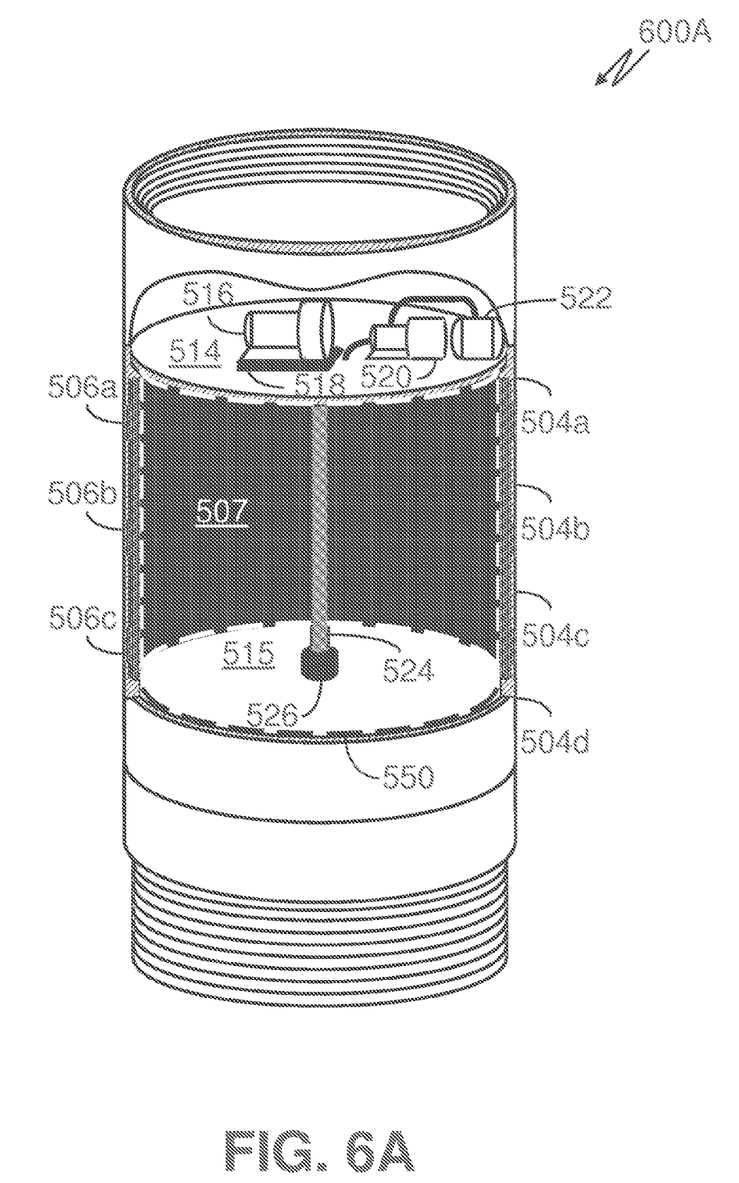
FIGS. 6A and 6B show cutaway views of different illustrative embodiments of the isolator segment of FIG. 5.
Figure 6B:
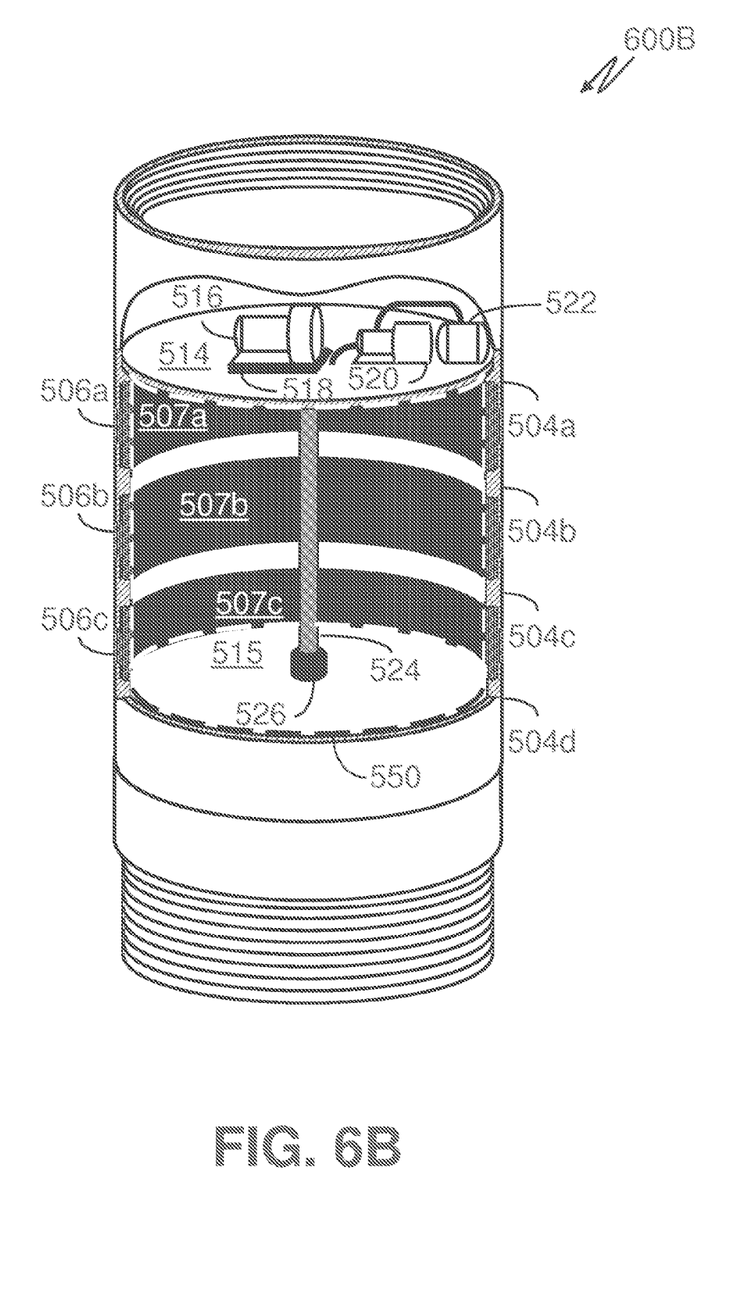

As previously noted, in at least some embodiments the spacers 506 are actually part of one or more sleeves inserted within the segments 504. FIGS. 6A and 6B each show cutaway views of an isolator (600A and 600B) that illustrates two different example configurations of such sleeves. Illustrative isolator 600A of FIG. 6A incorporates a single cylindrical sleeve 507 with an outer diameter of regions inserted within the segments 504 no larger than the common inner diameter of the segments. Each of the spacers 506 are implemented as protuberances that radially extend beyond the inner diameter of the segments. In at least some illustrative embodiments, the outer diameter of the protuberances is no larger than the common outer diameter of the segments 504. In other illustrative embodiments, the outer diameter of the protuberances equals the outer diameter of the segments 504 to produce an isolator with a smooth outer surface when in a stiffened configuration.

The materials chosen to manufacture sleeve 507 (e.g., rubbers or plastics), in addition to providing acoustic isolation, also provide the elasticity needed to allow isolator 600A to axially compress, axially expand and laterally flex. The thickness of the sleeve at least partially determines the flexibility and range of motion of isolator, as does the geometry of the sleeve (e.g., bellows incorporated into the sleeve(s)). For a given thickness, geometry and material, the flexibility of the isolator will be fixed. This flexibility can be varied, nonetheless, through the use of additional structures and mechanisms, as shown in the illustrative embodiment of FIG. 6A. A tensioner 524 (e.g., a cable, wire or chain) attaches to bulkheads 514 and 515 and mechanically limits any axial expansion of isolator 600A. An isolator grommet 526 (e.g., a rubber or plastic grommet) acoustically isolates tensioner 524 from the bulkhead 515 to prevent acoustic waves from propagating along the tensioner 524. A tension controller 516 (e.g., an electric motor/worm gear actuator driving a pulley) sets the tension on tensioner 524, which controls the axial compressive forces exerted along the walls of each segment 504. In at least some illustrative embodiments, tension controller 516 is acoustically isolated from the bulkhead 514 upon which it is mounted by isolator gasket 518. When the tension is increased, the axial compressive forces increase and the segments 504 compress each of the spacer protuberances 506. This increase in axial compressive force reduces the flexibility of isolator 600A relative to its flexibility with less tension applied on tensioner 524, thus stiffening the isolator.

The flexibility of isolator 600A can be increased by decreasing the thickness of sleeve 507, but such reductions can cause lateral instability of the isolator. In at least some illustrative embodiments of FIG. 6A, lateral stability is maintained by filling the volume 550 (formed by the bulkheads 514 and 515, the segments 504 and the sleeve 507 and shown with a dashed line) with a fluid (e.g., hydraulic fluid), which is then pressurized by pressure controller 520, drawing fluid as needed from fluid reservoir 522. In the embodiment shown, this produces a cylindrical volume 550, though the volume 550 may be annular in other embodiments that isolate the cable from the fluid or otherwise provide for passing wires or other tool components through the isolator. Many other volume geometries are contemplated, and are all within the scope of the present disclosure. Once the volume 550 is filled and pressurized, the fluid provides lateral stability while still allowing sleeve 507 to flex as needed when tension along tensioner 524 is decreased, allowing isolator 600A to flex further than an embodiment that does not incorporate a fluid while maintaining lateral stability (e.g., without buckling). The fluid also absorbs acoustic energy, further attenuating acoustic waves that may be propagating through isolator 600A.

The degree of flexing is adjusted by controlling both the tension along tensioner 524 and the pressure of the fluid. Increasing the tension and/or the pressure increases the stiffness of the isolator 600A, while decreasing the tension and/or the pressure decreases the stiffness and increases the flexibility of the isolator 600A. It should be noted that in at least some illustrative embodiments, tension controller 516 is not present and tensioner 524 operates to mechanically limit the axial expansion of isolator 600A. In such an embodiment, the stiffness of isolator 600A is set by pressure controller 520. In yet other embodiments, tensioner 524 may also be omitted, with the flexing of isolator 600A being mechanically limited by keys as previously described, and the stiffness of the isolator 600A being set by pressure controller 520.

It should also be noted that in at least some illustrative embodiments, tension controller 516 and/or pressure controller 520 are coupled to main electronics module 410, which houses the electronics that communicate with each controller. Tension controller 516 and pressure controller 520 may be coupled to electronics module 410 using any of a variety of communication and/or power links, including but not limited to electrical, optical and/or radio frequency (RF) links. Many techniques for providing and routing such links through logging tools and drillstrings are known in the art, and are not discussed further.

Additional isolator flexibility may be achieved by an alternative embodiment of sleeve 507 that substitutes one single sleeve for individual sleeves (507a-507c) between each segment (504a-504d), as shown in the illustrative example of isolator 600B of FIG. 6B. By using multiple sleeves rather than a single sleeve, adjacent segments can move further relative to each other and relative to the sleeve, as compared to the embodiment of FIG. 6A. Isolator 600B functionally operates in the same manner as described above for isolator 600A. It at least some illustrative embodiments, the relative motion between a segment and a sleeve is limited (to prevent separation and/or loss of fluid) through the use of techniques similar to those used to limit the movement of gaskets and seals. These techniques operate to allow the overlap between the sleeves 507 and the segments 504 to vary while maintaining the hydraulic integrity of isolator 600B. Such techniques are well known in the art and are not discussed further.

Figures 7A, 7B:
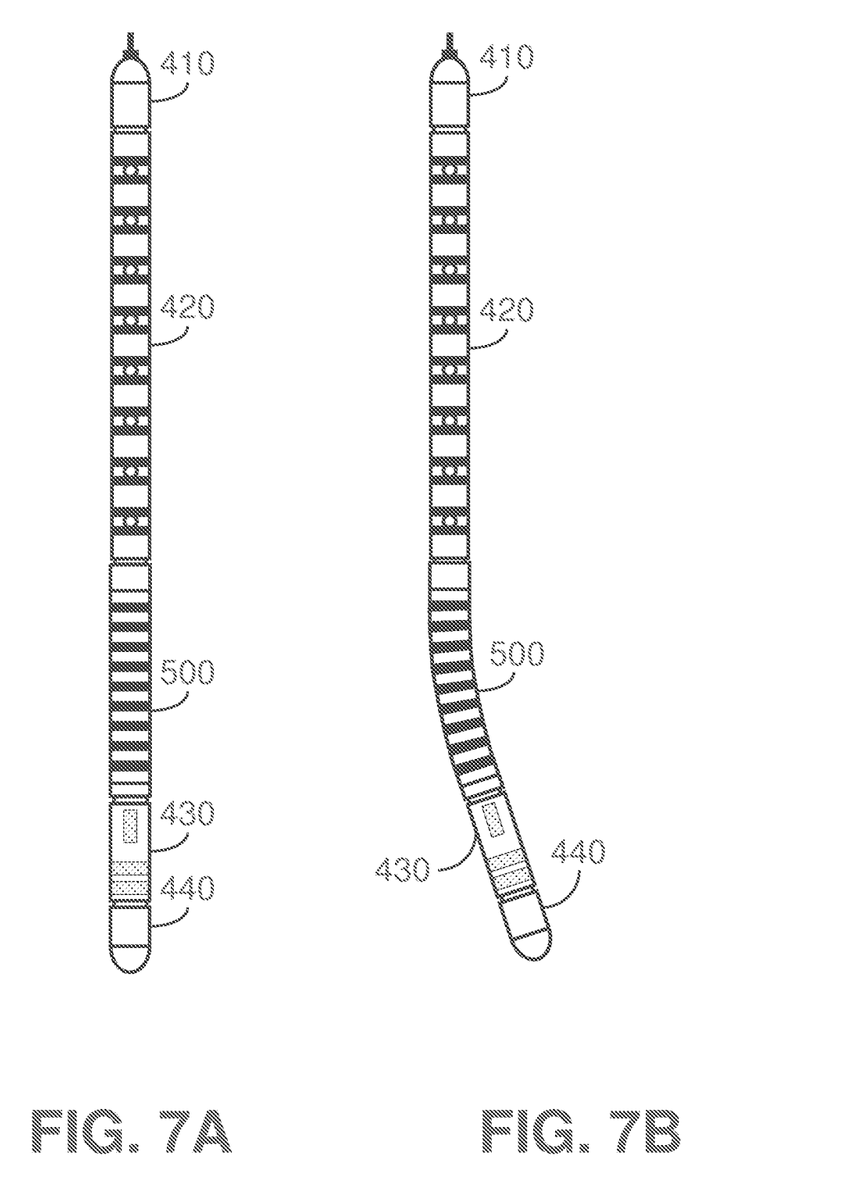
FIG. 7A shows an illustrative acoustic logging tool with the isolator in a stiffened configuration.
FIG. 7B shows an illustrative acoustic logging tool with the isolator in an unstiffened and flexed configuration.

To better appreciate the degree of flexibility of a tool or portion thereof that incorporates the illustrative isolator, an illustrative embodiment is shown in FIGS. 7A and 7B with an isolator 500 that includes 10 segments and 9 spacer protuberances. FIG. 7A shows the illustrative acoustic logging tool in its stiffened configuration, while FIG. 7B shows the same tool in an unstiffened configuration and flexed in an 18 degree bend from vertical, though other angles are possible (e.g., from 0 to 90 degrees from vertical). Such a flexing capability greatly assists in situations where the logging tool must pass tight bends and doglegs within the borehole without damaging the tool. In at least some illustrative embodiments, the same structures and mechanisms of isolator 500 are also incorporated within other sections of the tool (e.g., receiver 420 of the logging tool of FIGS. 7A and 7B), providing even more tool flexibility and flexibility control. In such embodiments, the stiffness of each section may be controlled separately or synchronously, depending upon the particular situation downhole. In at least some illustrative embodiments, this flexing control may also be useful for maintaining the tool in a more stiffened configuration through deviated sections of a borehole (relative to the stiffness used during acoustic logging when the tool is in a vertical position) to minimize contact between the tool's sensors and the borehole walls. The tool may subsequently be placed back in a less stiffened configuration when the tool is clear of the deviation and once again in a vertical position. By changing the tool configuration to minimize sensor contact with the borehole wall, reliable logging data can continue to be acquired as the tool passes through the deviation.

Figure 8:
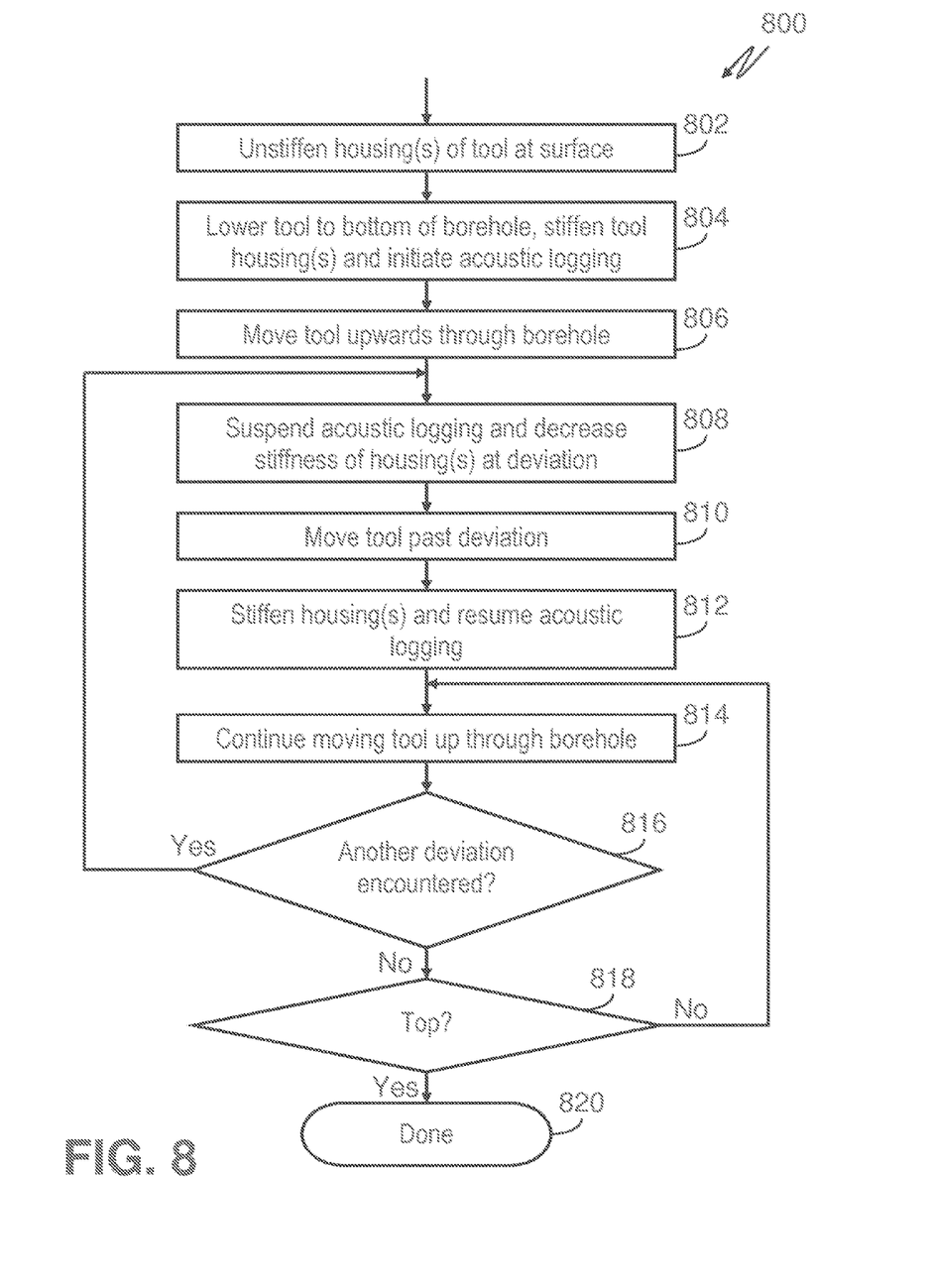
FIG. 8 shows an illustrative method for operating a variable stiffness downhole tool housing.

An illustrative use of the above described embodiments is shown in FIG. 8 as illustrative method 800. The method begins by setting one or more variable housings of an acoustic logging tool (e.g., housings that are part of the isolator and receiver sections of the tool) to an unstiffened configuration (block 802). The tool is then lowered to the bottom of the borehole, the housing(s) is/are set to a stiffened configuration and acoustic logging is initiated (block 804) as the tool is raised upwards through the borehole (block 806). For at least some boreholes (e.g., vertical boreholes), the stiffness of the tool is adjusted before acoustic logging is activated such that the flexural slowness of the tool is slower than the flexural slowness of the surrounding formation (not shown). This adjustment further reduces interference by acoustic waves that may travel along the body of the tool. When a deviation in the borehole is encountered, the stiffness of the housing(s) is/are decreased (block 808) to facilitate moving the tool past the deviation. In at least some embodiments, logging is suspended (block 808) as unstiffening and flexing of the tool housing(s) may reduce the acoustic isolation provided by said housing(s).

Once the tool is past the deviation (block 810) the housing(s) is/are again stiffened and acoustic logging is resumed if previously suspended (block 812). The tool continues to be raised up through the borehole (block 814) until another deviation is encountered (block 816) or the tool reaches the top of the borehole (block 818). If another deviation is encountered (block 816), blocks 808 through 814 are repeated. The tool continues to be raised up through the borehole (block 814) until the top is reached (block 818), ending the method (block 820).

It should be noted that in embodiments that utilize keys (like those shown in FIG. 5), the stiffened configuration of method 800 is set such that the keys do not contact any edge of a corresponding notch so as to maintain acoustic isolation between segments. Also, although the method 800 presented describes a vertical well wherein logging is performed as the acoustic logging tool is raised up through the borehole, other embodiments of method 800 may also include logging while lowering the tool, or logging while both lowering and raising the tool. Further, the systems and methods described are also applicable to non-vertical boreholes.

Numerous other modifications, equivalents, and alternatives, will become apparent to those skilled in the art once the above disclosure is fully appreciated. For example, other embodiments may include non-acoustic logging tools, as well as logging tools used within logging while drilling (LWD) and tubing conveyed logging operations. It is intended that the following claims be interpreted to embrace all such modifications, equivalents, and alternatives where applicable.

What is claimed is:
1. A variable stiffness downhole tool housing, comprising
a plurality of cylindrical segments positioned along a common axis and comprising at least a pair of segments each coupled to a bulkhead and positioned at either axial end of the tool housing;
at least one flexible cylindrical sleeve, positioned along the common axis between two segments of the plurality of cylindrical segments, comprising a first and second region with an outer diameter no larger than a common inner diameter of the two segments and a third region located between the first and second regions and with an outer diameter no larger than a common outer diameter of the two segments, the first and second regions each at least partially inserted into an end of one of the two segments;
a port, coupled to one of the bulkheads, that permits the passage of a fluid into a volume formed by the plurality of cylindrical segments, the at least one flexible cylindrical sleeve, and the bulkheads; and
a stiffness controller that controls the stiffness of the tool housing by controlling at least part of an axial force relative to the common axis and exerted between the two segments,
wherein the stiffness controller comprises a pressure controller, coupled to one of the bulkheads and to the port, that controls at least part of the axial force by setting the hydraulic pressure of the fluid filling the volume, said axial force comprising an expansive axial force; and
wherein axial expansion of the housing is mechanically limited.
2. The variable stiffness download tool housing of claim 1, further comprising:
a tensioner that axially couples the bulkheads to each other and controls at least part of the axial force exerted by the two segments on opposite sides of the third region, said axial force comprising a compressive axial force;

wherein the stiffness controller comprises a tension controller, coupled to one of the bulkheads and to the tensioner, which controls at least part of the compressive axial force by setting the tension along the tensioner.

3. The variable stiffness downhole tool housing of claim 2, wherein the tensioner is acoustically isolated from the bulkheads.

4. The variable stiffness downhole tool housing of claim 1, wherein the axial expansion of the housing is mechanically limited by a tensioner that couples the bulkheads to each other.

5. The variable stiffness downhole tool housing of claim 1, wherein the at least one flexible cylindrical sleeve is made of a material that attenuates acoustic waves.

6. The variable stiffness downhole tool housing of claim 1, wherein the at least one flexible cylindrical sleeve comprises rubber or plastic.

7. The variable stiffness downhole tool housing of claim 1, further comprising;
at least one additional segment of the plurality of cylindrical segments positioned along the common axis between the pair of segments coupled to the bulkheads; and
the at least one flexible sleeve further comprising a fourth region similar to the first and second regions and a fifth region similar to the third region, the fifth region positioned between the third and fourth regions;
wherein the fourth region is at least partially inserted into an end of the at least one additional segment.

8. The variable stiffness downhole tool housing of claim 1, further comprising;
at least one additional segment of the plurality of cylindrical segments positioned along the common axis between the pair of segments coupled to the bulkheads; and
at least one additional flexible sleeve, positioned along the common axis between one of the two segments and the one additional segment, comprising a fourth and fifth region similar to the first and second regions and a sixth region similar to the third region;
wherein the fourth region is at least partially inserted into an end of the one of the two segments and the fifth region is at least partially inserted into an end of the at least one additional segment.

9. The variable stiffness downhole tool housing of claim 1, wherein the variable stiffness downhole tool housing comprises an isolator or a receiver of an acoustic logging tool.

10. The variable stiffness downhole tool housing of claim 1, further comprising at least one key secured to the outside of a first segment of the two segments and axially extending past an end of the first segment and into a recessed notch in a second segment of the two segments, said notch being larger than a portion of the at least one key inserted into the notch in all directions in which a notch surface faces the at least one key.

11. The variable stiffness downhole tool housing of claim 10 being comprised by an acoustic logging tool, wherein the stiffness of the variable stiffness downhole tool housing is adjusted during operation of the acoustic logging tool such that the key is not in direct physical contact with the second segment.

12. The variable stiffness downhole tool housing of claim 10, wherein the at least one key limits the flexing of the two segments or limits axial compression, axial separation, or twisting between the two segments.

13. A method for operating a variable stiffness housing of a downhole tool, comprising:
activating a stiffness controller within the housing and setting the housing to a stiffened state that restricts flexing by increasing axial forces relative to a common axis and between two segments of the housing, said two segments corresponding to two of a plurality of cylindrical segments positioned along the common axis at opposite ends of the housing,
wherein increasing the axial forces comprises increasing axial expansion forces between the two segments by increasing the hydraulic pressure of a fluid contained within the housing between the two bulkheads, and further comprises mechanically limiting axial expansion of the housing;
moving the downhole tool through a borehole until a deviation in the borehole is encountered;
setting the housing to an unstiffened state to allow the housing to flex beyond previously restricted limits;
moving the downhole tool past the deviation;
setting the housing to the stiffened state once the downhole tool is past the deviation; and
continuing to move the downhole tool through the borehole.

14. The method of claim 13, wherein increasing the axial forces comprises increasing axial compression forces between the two segments by increasing tension along a tensioner that couples two bulkheads, each bulkhead coupled to one of the two segments.

15. The method of claim 14, wherein the tensioner is acoustically isolated from at least one of the two bulkheads.

16. The method of claim 13, wherein mechanically limiting the axial expansion of the housing comprises coupling the two segments to each other with a tensioner.

17. The method of claim 13, wherein mechanically limiting the axial expansion of the housing comprises coupling the two segments by at least one key attached to the exterior of a first of the two segments and inserted into a notch on the exterior of a second of the two segments.

18. The method of claim 13, further comprising:
maintaining the housing in the stiffened state; and
operating an acoustic logging tool that comprises the housing while the housing is in the stiffened state,
wherein the two segments are separated by at least one cylindrical sleeve positioned along the common axis, with each end of the at least one cylindrical sleeve to either side of a protuberance and at least partially inserted inside an end of one of the two segments, and
wherein the at least one cylindrical sleeve attenuates acoustic waves propagating through the housing.

* * * * *